Jan. 13, 1953 E. W. GOLDBERG 2,625,077
PICTURE PROJECTOR
Filed Oct. 16, 1946 3 Sheets-Sheet 1
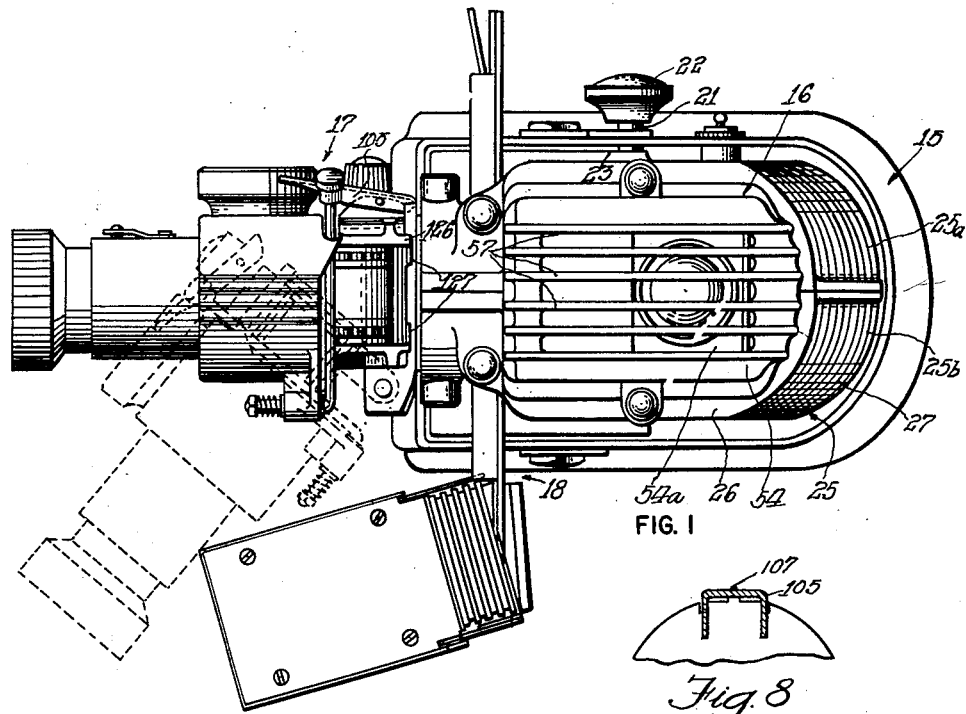
FIG. 1
FIG. 8
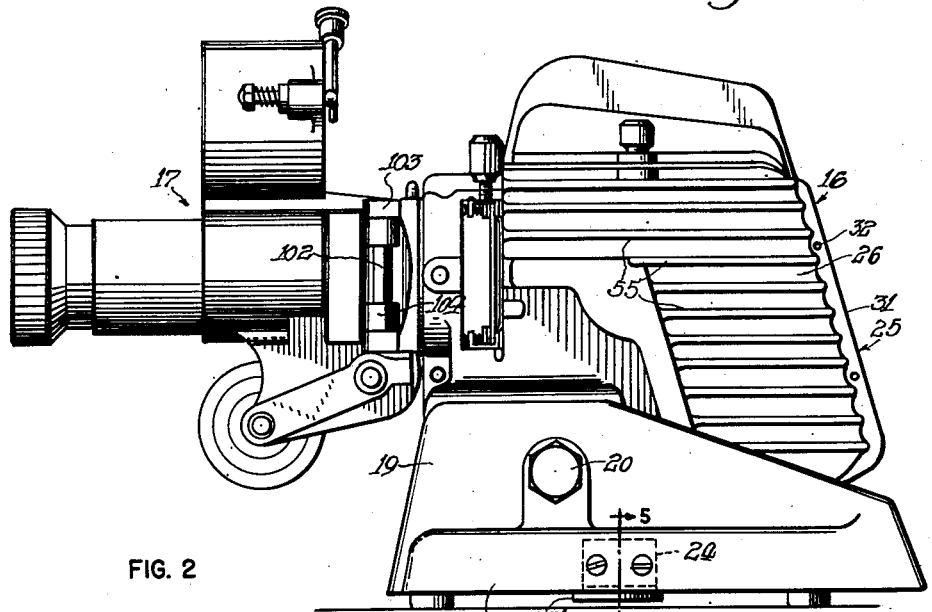
FIG. 2
INVENTOR.
ERNEST W. GOLDBERG
BY Henry Hech
ATT'Y

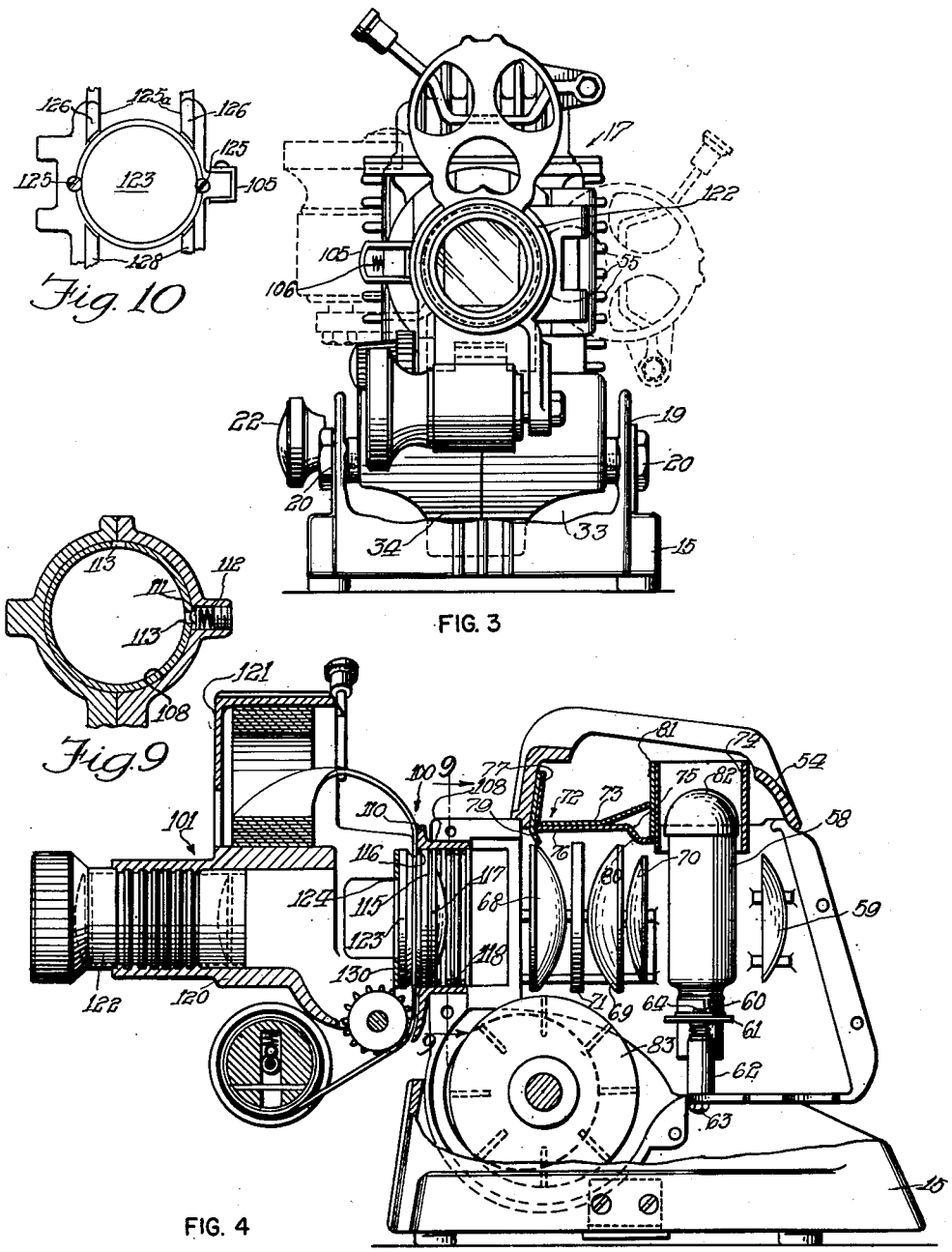

Jan. 13, 1953     E. W. GOLDBERG     2,625,077
PICTURE PROJECTOR
Filed Oct. 16, 1946     3 Sheets-Sheet 3
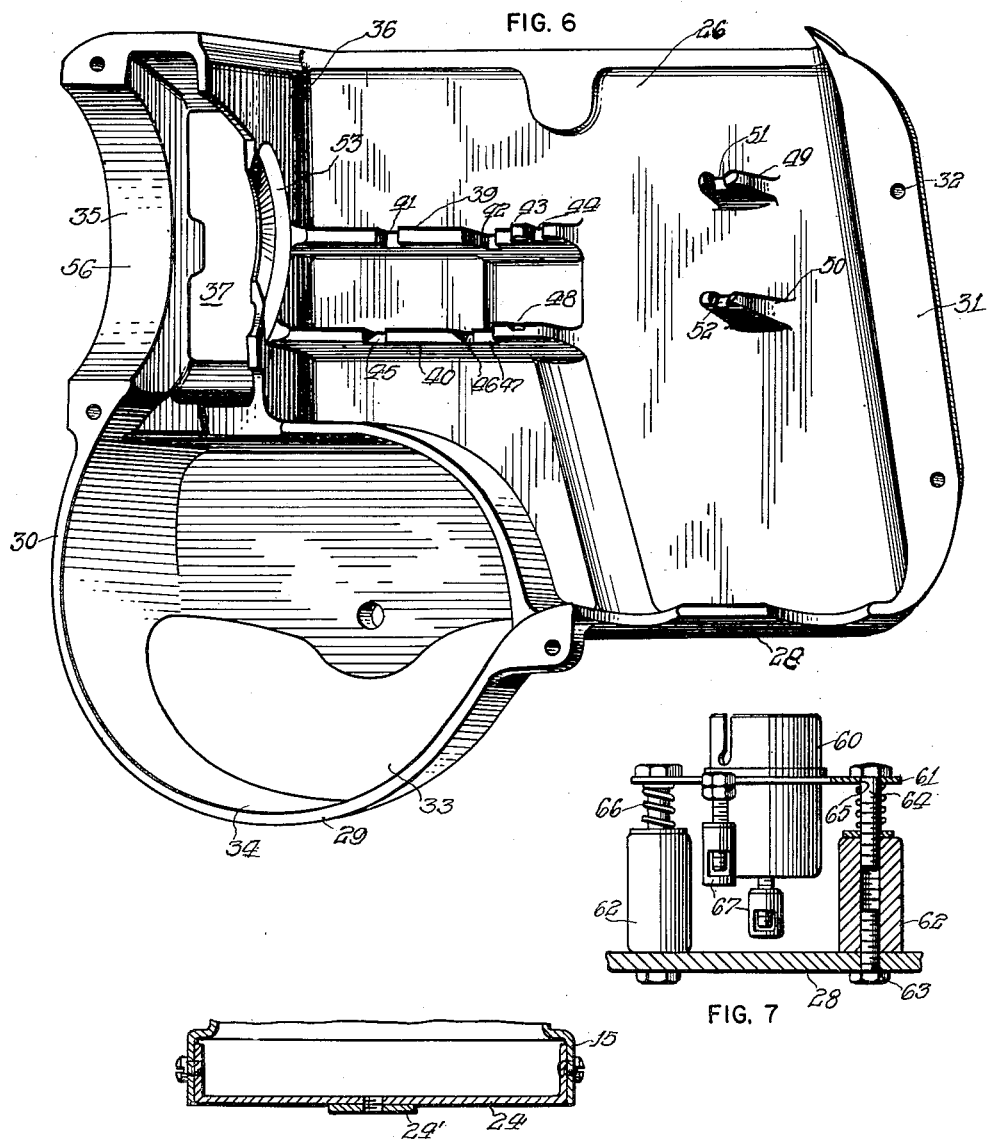
INVENTOR.
ERNEST W. GOLDBERG
BY
ATT'YS Patented Jan. 13, 1953

2,625,077

UNITED STATES PATENT OFFICE 2,625,077

PICTURE PROJECTOR

Ernest W. Goldberg, Chicago, Ill.

Application October 16, 1946, Serial No. 703,695

8 Claims. (Cl. 88—24)

The invention relates to projectors and has as a general object the provision of a projector of new and improved construction.

Another object is to provide a projector having a built-in blower for cooling the lamp housing, permitting the employment of a small size lamp of the necessary wattage and resulting in improved housing construction and mounting.

Another object of the invention is the provision of simplified means for removably maintaining a plurality of condenser lenses in proper relative position in a projector.

A further object is to provide a projector having an adjustable light source socket permitting adjustment of the light source in a vertical plane as well as tilting from one side to the other.

Numerous other objects and advantages of the invention will be apparent as it is better understood from the following description, which, when taken in connection with the accompanying drawings, discloses a preferred embodiment thereof.

In the drawings,

Fig. 1 is a top plan view of a projector embodying the features of this invention.

Fig. 2 is a side elevational view of the projector shown in Fig. 1 with the slide stacker broken away.

Fig. 3 is a front elevational view of the projector shown in Fig. 2.

Fig. 4 is a vertical axial sectional view of the projector.

Fig. 5 is a fragmentary transverse sectional view taken approximately along the line 5—5 of Fig. 2.

Fig. 6 is a perspective view of one-half of the housing.

Fig. 7 is an enlarged fragmentary view partially in elevation and partially in section of the socket mounting for the light source.

Fig. 8 is an enlarged and fragmentary view of the projector head catch, and

Fig. 9 is a section on the line 9—9 of Fig. 4.

Fig. 10 is a fragmentary view in a plane between the aperture classes and looking forward.

This application is a continuation in part of application Serial No. 514,140 filed December 13, 1943, now abandoned.

While the invention is susceptible of various modifications and alternative constructions, it is here shown in the drawings and will hereinafter be described in a preferred embodiment.

Referring more particularly to the drawings, the projector comprises generally a base 15, a housing 16, a continuous strip slide film projector head, generally designated 17, and an individual slide carrier and stacker, generally designated 18. The base 15 is in the form of a shell having upstanding side walls 19. The housing 16 is pivotally mounted upon the base 15 for pivotal movement in a vertical plane about an axis extending transversely of the base. To that end the lower portion of the housing is received between the upstanding side walls 19 of the base and is journaled upon the inner ends of a pair of bolts 20 which project through the side walls 19 and form the transverse axis about which the housing pivots. To clamp the housing in desired position, a screw 21 having a knurled knob 22 for convenient manual operation is threaded through a side wall 19 to abut against a surface 23 formed on the housing 16 for that purpose. Extending transversely of the base and rigid therewith is a strap 24 having at its midpoint an apertured boss 24' adapting the projector for mounting in a tripod.

The housing 16 is of two-part construction composed as best seen in Figs. 4 and 6, of a main portion 25 being elongated and composed of two equal parts 25a and 25b divided along a vertical plane intersecting the longitudinal axis and each part has a side wall 26 which continues into a curved rear wall 27 and a bottom wall 28 which is straight and then is semi-cylindrical as at 29 which merges into the front wall 30.

The rear wall has a flange 31 provided with apertures 32.

The semi-cylindrical bottom wall is cut away as at 33 leaving a web 34. The cut-away portion 33 permits the ingress of air for a purpose hereinafter further referred to.

Each part 25a and 25b is formed with a semi-cylindrical collar 35 at the front wall and spaced therefrom with a partition 36. Between the collar and the partition is an opening 37 to permit the insertion of the slide carrier 18.

Each side wall 26 is formed with two superposed ledges 39 and 40 which extend from the partition 36 to approximately the center of the side wall.

The ledge 39 is formed with kerfs 41, 42, 43 and 44 and the ledge 40 is formed with kerfs 45, 46, 47 and 48 which are in respective vertical registry with the kerfs of ledge 39. Each side wall is further provided with a pair of legs 49 and 50 each provided with a kerf 51 and 52 respectively.

Attention is called to the fact that the collar 35, a segment 53 of the partition 36 and the kerfs of ledges 39 and 40 and of lugs 49 and 50 are machined and by reason of their arrangement the machining may be carried out by a multiple arrangement of milling devices and in a single operation.

The two parts 25a and 25b when put together complement each other to form the housing 16.

The housing is open at the top and may be closed by a cover 54.

The side walls and the rear end wall of the housing are formed externally with horizontally disposed fins 55 extending circumferentially thereof in vertically spaced relation.

The collar 35 defines a cylindrical passage 56 for the projection therethrough of the light rays.

The cover 54 has an opening 54a at the top to permit the upward discharge of heated coolant air circulated through the housing. A grille work composed of laterally spaced fins 57 extending longitudinally of the housing overlies the opening.

Interiorly of the main portion 25 of the housing 16 is located the light source or lamp 58 and to the rear of the lamp is located a reflector 59. Herein the lamp 58 is given an adjustable mounting in order to permit of the variation which exists in the location of the filaments within the different lamps as manufactured by the lamp producers. To that end, the socket 60 in which the lamp 58 is received is carried by a plate 61 which in turn is adjustably supported from the flat portion 28 of the bottom wall of the housing. Such adjustable support comprises a pair of insulating spools 62 each upstanding from the wall portion 29 and secured by a bolt 63 extending through the bottom wall and threaded partially within the spool 62. Threadedly received in the top end of each spool 62 is another bolt 64 which passes through an aperture 65 formed in the plate 43. A compression spring 66 is interposed between the top of the spool 62 and the plate 61 so as to support the plate in engagement with the head of the bolt 64. The aperture 65 is made slightly larger than the shank of the bolt 64 in order that the plate 65 may tilt slightly relative to the bolt. It will thus be seen that the socket may be adjusted vertically by turning the bolts 64 into or out of the spools 62 to the same extent and may be tilted by adjusting one screw to a greater extent than the other. Terminals 67 are, of course, provided for the connection of lead wires thereto.

The ledges 39 and 40 are provided to properly support and space the lenses between the light source and the object to be projected.

A plurality of condensing lenses 68, 69 and 70 are inserted respectively into corresponding kerfs of the ledges.

In addition a glass disk 71 is similarly supported between the two foremost lenses 68 and 69 to function as a heat absorbing filter. It will be understood, of course, that the upper ledge 39 is located substantially on a level with the center line with which the axis of the lenses is to coincide, and that the ledge 40 extends inwardly a greater distance than the upper ledge so as to provide a support for the lenses and filter.

In this manner the lenses and filter may be inserted vertically through the top opening of the housing and will be accurately held in position when received at its edges in the kerfs of the ledges.

The lenses and the filter 71 are retained against loss out of the ribs, should the projector be accidentally inverted, by means, generally designated 72, which also serves as a light baffle and masking means. This means, as best seen in Fig. 4, comprises a plate 73 substantially equal in width to the width of the housing and a tube 74 slightly larger in diameter than the lamp 58. The tube and the plate are supported with the tube in surrounding relation to the top of the lamp 58 and the plate forwardly of the tube by a narrow bracket strip, generally designated 75, having a horizontal portion 76 disposed just above the lenses and the filter 71 to which the plate 73 is secured as by welding or brazing. At its forward end, the bracket 75 has an upturned end 77 by means of which the strip and the parts carried thereby is secured to the top closure portion 26 by brazing 78. Secured to this upstanding end 77 is a strip 79 projecting downwardly beyond the horizontal portion 76 of the bracket strip and bent slightly rearwardly to engage and retain the forwardmost lens 68 in position. At its rear end, the bracket strip is first formed with a downward offset 80 overlying the rearmost lens, which is smaller in diameter than the other lenses and is then formed with an upwardly bent portion 81 to which the tube 74 is welded or brazed. The lamp 58 conventionally carries an opaque cap 82.

The reflector 59 is held in the kerfs of lugs 49, 50.

As already described, there has been designed and built into the housing 16 the cylindrical enlargement 29 which, constitutes a chamber for a suitable electric motor and fan unit, generally designated 83 (see Fig. 4). The fan draws air inwardly through the openings 33 and forces the same upwardly and rearwardly over and around the lenses and the lamp 58, and thence outwardly through the top closure portion 54. This built-in fan, producing forced air cooling, permits the employment of a lamp of the required rating which is substantially smaller than a lamp of the same rating large enough to dissipate the heat generated through the employment of convection currents alone. As a result of the permissible use of this smaller lamp, the housing 16 can be mounted higher relative to the base so as to allow for tilting of the housing, without an increase in over-all height of the projector. Furthermore, this arrangement is attained without loss of stability of the projector and without necessity of increasing the size of the base over that conventionally employed for this size of projector.

For projecting from a continuous strip film, a plain focusing nose, the projector head 17 is employed. This head is of two-part construction comprising (Fig. 4) an attaching part, generally designated 100 and a main part, generally designated 101. The parts are hinged together by means of a pin 102 passing through appropriately formed ears 103 and 104 on the attaching and main parts, respectively. Opposite the hinge the main part carries a pivoted latch 105 (Fig. 8) urged into latching position by a compression spring 106 and designed for cooperation with a pin 107 (see Fig. 8) projecting radially from the attaching part 101. The main part may thus be latched in operative position as shown in Fig. 1, or unlatched and swung to an inoperative, film loading position, indicated by the broken line outline of Fig. 1.

The attaching part 100 has a tubular portion 108 of considerable axial dimension, which portion is accurately machined externally to be received in a bore 109 formed in a reduced portion of the passage in the housing 16. This reduced portion is also made of considerable axial dimension so as to provide a large, peripheral type bearing surface for the attaching part 100. The bore 109 and the tubular portion 108 are machined to have a close but sliding fit so that, with the large width or axial dimension of the cooperating surfaces the attaching part 100 is fully capable of supporting the remainder of the head even though there is a very substantial overhang. With this construction, the head 17 may be attached or removed by a simple inserting or withdrawing operation, without the use of tools. A flange 110 projecting radially outwardly from the tubular portion 108 limits insertion of the tubular portion 123. In order to provide some latching means holding the attaching part 115 against withdrawal, a detent in the form of a ball 111 and a compression spring 112 mounted in the main portion of the housing and projecting into the bore 109 is provided. Adapted to cooperate with the ball 111 are a pair of apertures 113 formed in the tubular portion 108. These apertures are spaced exactly 90° apart, and moreover, are so positioned that when engaged by the ball 111 the head will be in proper vertical position for the projection of vertical pictures, and when engaged in the other aperture will be in proper horizontal position for projecting pictures running longitudinally of the strip of film.

In addition to functioning as an attaching means for the main part 101, the part 100 serves as a mounting for the rear film aperture defining glass 115. The glass 115, which herein is circular and with a beveled edge, is retained against loss out of the front of the attaching part 100 by a beveled radially upwardly projecting flange 116, the front face of the glass 115 when properly positioned projecting slightly beyond the forward face of the flange 110 and the flange 116. Also carried by the part 100 positioned in the tubular portion 108 to the rear of the glass 115 is a light pick-up lens 117, with both the aperture glass and the lens yieldably retained in position by a coil spring 118 having but a relatively few number of turns. The spring is retained in the tubular portion 108 without the aid of any retaining ring by forming the last turn of the coil larger than the remaining turns for projection into an internally peripheral groove formed in the tubular portion 108 at the rear end thereof.

The main part 101 of the projector head comprises a tubular, central portion 120 coaxial with the projected light, a cylindrical film container or magazine 121 mounted above the central portion, as viewed in Figs. 1, 3 and 4, and various depending or enlarged portions all cast integrally. At its forward end the tubular, central portion carries a focusing tube or nose-piece 122, while at its rear end it carries a front film aperture glass 123. This glass, like its cooperating glass 115 is circular and with a beveled edge. It is retained against forward movement by shoulders 124 formed internally of the tubular, central portion 120 and is retained against rearward loss by a pair of screws 125. Machined surfaces 125a are provided on rearward projections 126 of the tubular central portion immediately above the glass 123 (see Figs. 1, 4 and 10) to form a guide of the exact width of the strip of film to be passed through the projector. To accommodate the projections 126 the front face of the attaching part 100 is cut away slightly at 127 (see Fig. 1). Similar projections 128 are disposed beneath the glass 123 to continue the formation of the film passage, though these latter projections are not machines. It will thus be seen that the aperture glasses 115 and 123, when the main part 101 is swung to operative position, confine the film therebetween, compressing the same flat to retain the same truly perpendicular to the path of projected light, so as to maintain critical focusing. The spring 118 is of such strength as to accomplish the above, but not to press the glasses so firmly together as to retard the motion of the film therebetween, or as to scratch the surface of the film. Scratching of the film is also reduced by the employment of round aperture glasses, inasmuch as the film in curving to pass between the glasses strikes only the top portion of the arc defined by the projections 126. Interposed between the glass 123 and the shoulders 124 is a double frame masking plate 130 which is offset along its vertical edges to form a recessed track for the reception of a single frame masking plate (not here shown).

I claim:

1. In a projector, a lamp housing consisting of separable castings defining said housing in assembled relation, integral lens-seating slots formed on the interiorly disposed surfaces of said castings and disposed in the assembled condition of said castings such that there are aligned pairs of said slots respectively defining lens seats adapted to receive directly the edgewise parts of lens elements.

2. In a projector, a lamp housing having integral projections on opposite internal wall portions situated transversely of the axis of the projected light, opposite projections as aforesaid being disposed in pairs, at least, and each having seating formations therein for seating engagement with peripheral portions of lenticular projection elements for optical projection of light from a lamp in said housing.

3. The structure defined in claim 2 in which said integral projections consist of a pair of horizontal parallel ribs, one on each of the opposite vertical side walls of the housing transversely of the optical axis, and in addition a pair of vertically aligned lugs on said last-mentioned walls, and said seating formations are in the form of slots in said ribs and lugs such that the slots are aligned in corresponding opposite ribs and lugs to receive peripheral portions of said lenticular elements for removably seating the same in accurate optical alignment as set forth.

4. A housing for projectors and formed of complementary shells meeting in assembled relation along a substantially median dividing line contained in a vertical plane through the optical axis of the projector, said shells having integral internal wall portions on opposite sides of said axis in alignment with each other with lens and reflector seating formations therein to engage peripheral portions of lens and reflector elements on approximately diametrically opposite sides of said elements for removably seating the same as aforesaid, said shells defining a top opening in the housing for access to said elements, said opening adapted to be closed by a cover structure.

5. In a projector of the type including a lamp housing open at the top and adapted to contain a lamp and having an opening, for the passage of projector light therefrom, lens-mounting means comprising horizontally disposed ribs formed interiorly of, and integrally with the opposite side walls of said housing adjacent said opening and having spaced recesses therein for removably retaining and directly seating by downward insertion the edgewise portions of lenses in proper position relative to each other and to said opening by insertion or removal of lenses through the top opening of the housing.

6. In a projector, a lamp housing open at the top and adapted to contain a lamp, said housing having an opening for the passage of projected light therefrom, improvements comprising lens-mounting means in the form of opposite horizontally disposed ledges formed interiorly of, and integrally with, the side walls of said housing adjacent said opening, and having spaced kerfs cooperating to define lens seats for directly seating a plurality of lenses, a cover for said housing, and means on said cover for securing said lenses against accidental displacement from said seats.

7. In a projector, a lens housing having at least two opposite walls in each of which are formed integral, oppositely complementary lens-seating recesses respectively spaced apart crosswise of said housing between said opposite walls a distance sufficiently less than the diameter of a lens element to be received in any complementary pair, at least, of said recesses, to support said element securely in a predetermined condition of optical alignment and stability in said housing.

8. In a picture projector, a housing structure including at least two mating sections joined along a plane including the optical projection axis, said sections being respectively provided with integral interior projections with lens-seating slot formations therein for receiving and seating marginal edge portions of lens elements, the said seating formations of one section being aligned with complementary formations in the mating section to seat and mount said lens elements in alignment with said optical axis.

ERNEST W. GOLDBERG.

REFERENCES CITED

The following references are of record in the file of this patent:

UNITED STATES PATENTS

| Number | Name | Date |
| --- | --- | --- |
| 786,883 | Edmonds | Apr. 11, 1905 |
| 1,032,065 | Kamm | July 9, 1912 |
| 1,146,948 | Patterson | July 20, 1915 |
| 1,250,820 | Dyer et al. | Dec. 18, 1917 |
| 1,535,218 | Everett | Apr. 28, 1925 |
| 1,658,557 | Foster | Feb. 7, 1928 |
| 1,738,762 | De Vault | Dec. 10, 1929 |
| 2,070,325 | Victor | Feb. 9, 1937 |
| 2,213,711 | Lueck | Sept. 3, 1940 |
| 2,213,779 | Young | Sept. 3, 1940 |
| 2,231,743 | Young et al. | Feb. 11, 1941 |
| 2,292,966 | Osterberg et al. | Aug. 11, 1942 |
| 2,301,415 | Koehl | Nov. 10, 1942 |
| 2,344,263 | Perkins | Mar. 14, 1944 |
| 2,366,554 | Peck et al. | Jan. 2, 1945 |